United States Patent [19]
Zetterström

[11] Patent Number: 5,836,712
[45] Date of Patent: Nov. 17, 1998

[54] JOINT BETWEEN TWO COMPONENTS

[75] Inventor: Sigvard Zetterström, Hakenäset, Sweden

[73] Assignee: AB Volvo, Sweden

[21] Appl. No.: 817,664

[22] PCT Filed: Oct. 25, 1995

[86] PCT No.: PCT/SE95/01266

§ 371 Date: Apr. 22, 1997

§ 102(e) Date: Apr. 22, 1997

[87] PCT Pub. No.: WO96/12897

PCT Pub. Date: May 2, 1996

[30] Foreign Application Priority Data

Oct. 25, 1994 [SE] Sweden ................................. 9403659

[51] Int. Cl.⁶ ....................................................... F16B 2/00
[52] U.S. Cl. ............................ 403/334; 403/267; 403/383
[58] Field of Search .................................. 403/333, 334,
403/375, 326, 267, 266, 373, 383; 285/332,
332.1; 280/124.1, 788

[56] References Cited

U.S. PATENT DOCUMENTS

| | | | |
|---|---|---|---|
| 1,693,848 | 12/1928 | Kyle | 403/334 X |
| 1,765,651 | 6/1930 | Bryant | 403/333 X |
| 4,022,500 | 5/1977 | Van Den Beld | 285/332 |
| 4,076,285 | 2/1978 | Martinez | 285/332 |
| 4,846,490 | 7/1989 | Hashimoto et al. | 403/334 X |
| 5,176,415 | 1/1993 | Choksi | 285/332.1 X |

FOREIGN PATENT DOCUMENTS

| | | |
|---|---|---|
| 0 203 210 | 12/1986 | European Pat. Off. . |
| 0 373 125 | 6/1990 | European Pat. Off. . |
| 0 503 121 | 9/1992 | European Pat. Off. . |
| 357 399 | 8/1922 | Germany . |
| 23 52 711 | 5/1980 | Germany . |
| 24 60 382 | 4/1986 | Germany . |
| 432 133 | 3/1984 | Sweden . |
| 596136 | 12/1947 | United Kingdom .................... 285/332 |
| 2040379 | 8/1980 | United Kingdom .................... 285/332 |

*Primary Examiner*—Harry C. Kim
*Attorney, Agent, or Firm*—Lerner, David, Littenberg, Krumholz & Mentlik

[57] ABSTRACT

A joint between an at least hollow ended, generally cylindrical first component and a second component. The first component has a first end portion terminating in a first free end region, a second end portion terminating in a second free end region, and a mid portion extending between the first and second end portions. The mid portion has a first pre-determined external diameter and the first end portion has an external diameter which increases gradually from the first pre-determined external diameter to a second pre-determined external diameter at the first free end region. The first end portion is adapted to be pushed onto a tapered pin extending from the second component to a joined position. To insure transmission of rotational forces, in the joined position the first free end region of the first component extends into a generally ring-shaped socket in the second component, with the socket having at least one substantially planar circumferentially and axially extending surface against which a corresponding planar surface extending axially from the free end of the first free end region abuts.

12 Claims, 2 Drawing Sheets

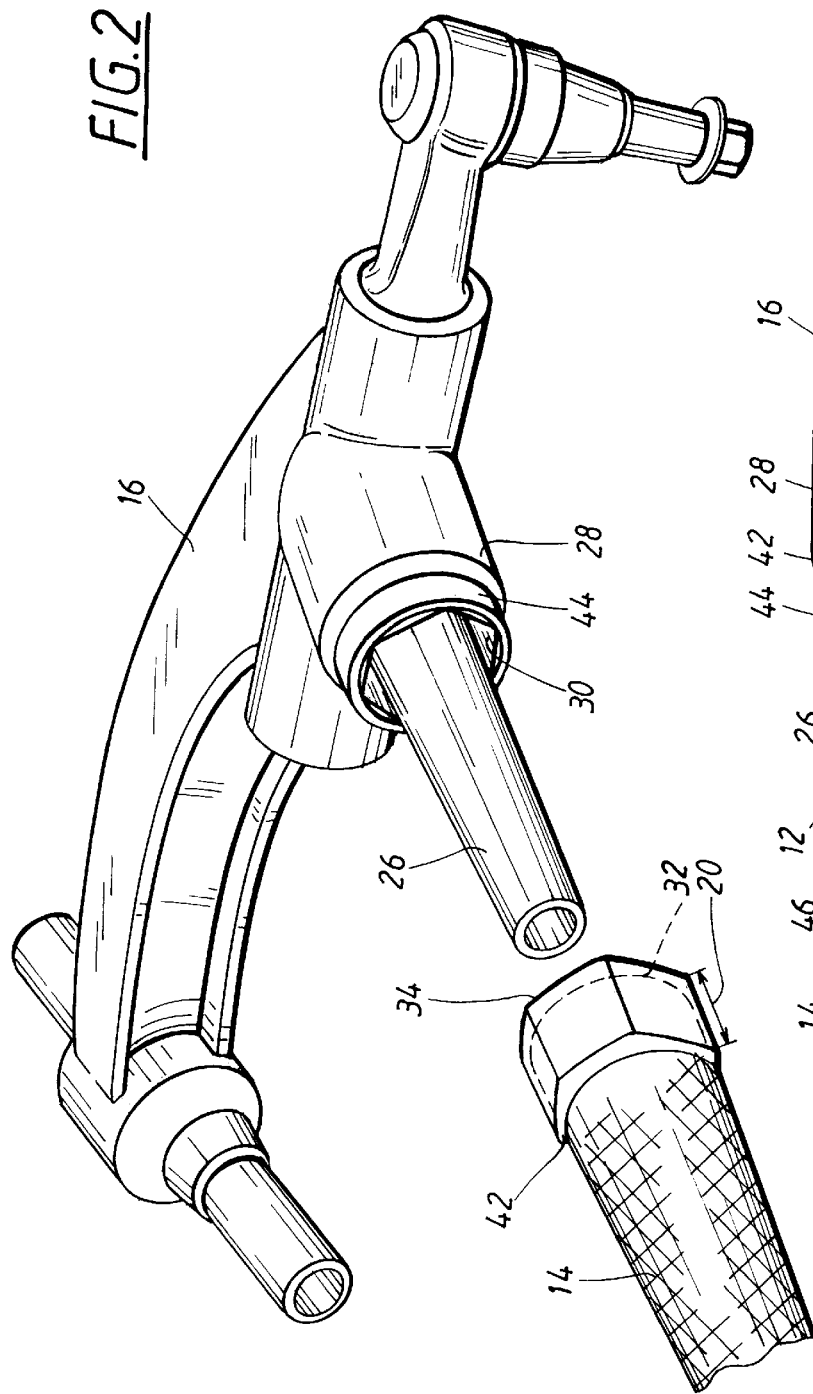

JOINT BETWEEN TWO COMPONENTS

FIELD OF THE INVENTION

The present invention relates to a joint between an at least hollow ended, generally cylindrical first component and a second component.

BACKGROUND OF THE INVENTION

In order to permit rotational transmission between a shaft-like first component and a second component, it is known to provide the components with interengaging splines or to key the components together. Alternatively, the shaft-like component may be provided with a flattened circumferential portion which cooperates with a flat surface on the second component.

It is also known to press fit a hollow shaft-like first component onto a tapered pin on a second component. Thus, as the first component is pressed onto the second component, the diameter of the first component is forced to increase, resulting in a decrease of the wall thickness of the first component.

SUMMARY OF THE INVENTION

It is an object of the present invention to provide an improved joint between an at least hollow ended, generally cylindrical first component and a second component, which joint is suitable for transmitting rotational and bending forces.

In accordance with the present invention, these and other objects have now been accomplished by the invention of a joint between an at least hollow ended, generally cylindrical first component and a second component, the first component comprising a first end portion terminating in a first free end region, the second end portion terminating in a second free end region, and a mid portion extending between the first and second end portion, the mid portion presenting a first predetermined external diameter and the first end portion presenting an external diameter which increases gradually from the first predetermined external diameter to a second predetermined external diameter at the first free end region, the first free end region presenting a free end from which at least one planar surface axially extends, the second component comprising a generally ring-shaped socket presenting at least one substantially planar circumferentially and axially extending surface, and a tapered pin extend from within the ring-shaped socket, wherein the first end portion of the first component is adapted to be pushed onto the tapered pin on the second component to a joined position such that in the joined position the first free end region of the first component extends into the generally ring-shaped socket of the second component and the at least one planar surface extending axially from the free end of the first free end region of the first component abuts the at least one substantially planar circumferentially and axially extending surface of the second component.

BRIEF DESCRIPTION OF THE DRAWINGS

This invention will be described in the following by way of example only and with reference to the attached drawings, in which:

FIG. 2 is a schematic perspective view of two components of the suspension assembly of FIG. 1 which are to be joined by a joint according to the present invention; and FIG. 3 is a partial sectional view through the two components of FIG. 2 in a joint condition.

DETAILED DESCRIPTION

Figure 1:
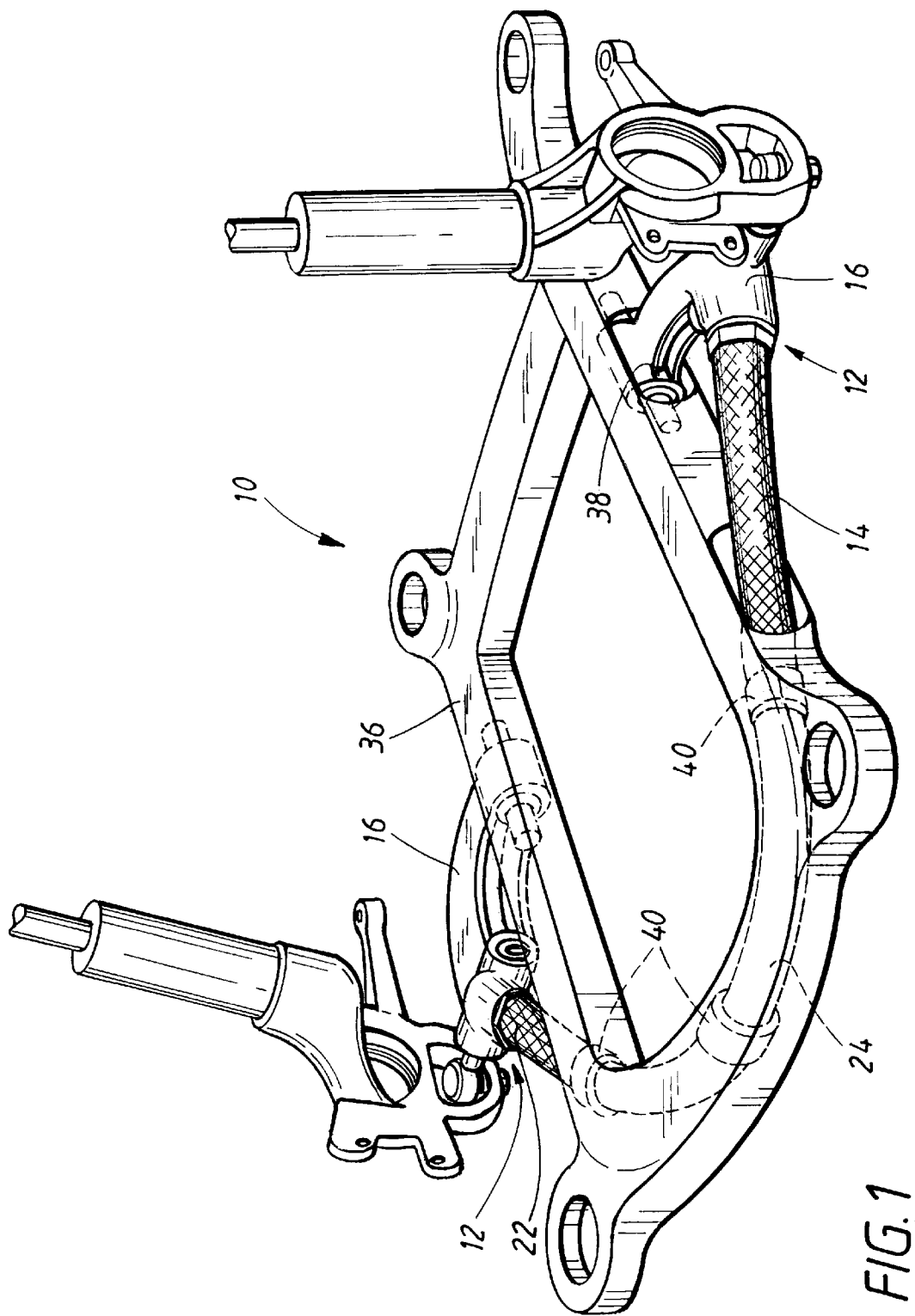
FIG. 1 is a schematic perspective view of a suspension assembly for a vehicle, the assembly employing a pair of joints according to the present invention.

In FIG. 1, reference numeral 10 generally denotes a suspension assembly for a vehicle, the assembly incorporating a pair of joints generally denoted by 12 according to the present invention. The joints 12 unite an at least hollow ended, generally cylindrical first component 14 and a second component 16. In the illustrated example, the first component 14 is a generally omega-shaped, hollow composite spring, while the second component 16 is a suspension arm.

With particular reference to FIGS. 2 and 3, the first component 14 comprises a first end portion 18 terminating in a first free end region 20, a second end portion 11 (FIG. 1) terminating in a second free end region, and a mid portion 24 extending between the first and second end portions. The mid portion 24 of the first component 14 presents a first predetermined external diameter. As is clearly illustrated in FIG. 3, the first end portion 18 of the first component presents an external diameter which increases gradually from the first predetermined external diameter to second. predetermined external diameter at the first free end region. In this respect, the expression "increases gradually" implies that the outer surface of the first component forms an angle which is no more than 60 degrees, preferably no more than 45 degrees with respect to the longitudinal axis of the first component. The first end portion 18 of the first component 14 is adapted to be pushed onto a preferably hollow tapered pin 26 extending from the second component 16 until the joined position as illustrated in FIG. 3 is reached.

In accordance with the present invention, in the joined position the first free end region 20 of the first component 14 extends into a generally ring-shaped socket 28 in the second component 16, which socket 28 is generally coaxial with the tapered pin 26. In addition, the socket 28 is provided with at least one substantially planar circumferentially and axially extending surface 30 against which a corresponding substantially planar surface 32 extending axially from the free end 34 of the first free end region 30 of the first component 14 abuts. In this manner, both rotational and bending forces can be transmitted from the second component to the first component.

It is understood that the expression "substantially planar" is intended to encompass any deviation from the otherwise circular circumference of the components which will permit a mechanical interlocking of the components. Thus, the substantially planar surfaces may even exhibit a degree of curvature, provided that the radius of such curvature is different from the radius of curvature of the remainder of the substantially circular region of the component.

In the embodiment illustrated in FIG. 1 by way of example in which a pair of joints 12 according to the present invention are utilized, the first component 14 is, as previously mentioned, a generally omega-shaped hollow composite spring, while the second component 16 is a suspension arm. In addition to these components, the front suspension assembly 10 comprises a subframe 36 which may be fabricated from steel or cast in aluminum or magnesium. Alternatively, a fiber-reinforced plastic may be employed for both the subframe 36 and the spring 14. Each suspension arm 16 is attached to the subframe at a respective pivot location 38 immediately adjacent the wheels (not shown)of the vehicle. To ensure accurate and constant wheel alignment, the suspension arm 16 must of course be very stiff. On the other hand, the composite spring 14 which extends in a loop must be torsionally flexible and radially resilient, to thereby serve as the spring in the suspension assembly. The stiffness/flexibility properties of the spring 16 are attained by selecting the orientation and thickness of the layers of fibers making up the composite structure. Typically, the spring may be made from a glass fiber/epoxy composite having a diameter of 40 mm and a wall thickness of between 4 and 6 mm. In this manner, the spring can also be designed to function as an antiroll bar.

Due to the inherent differences in stiffness dictated by their respective functions between the first and second components, it is advantageous if a progressive transition of rotational stiffness between the components can be attained. In this manner, a more reliable joint can be achieved. Accordingly, in accordance with a preferred embodiment of the invention, and as best illustrated in FIG. 3, the generally cylindrical first component 14 exhibits a substantially constant material wall thickness in the first end portion 18 from the mid portion 24 to the first free end region 20. Since the diameter of the first free end portion increases towards the first free end region at the me time that the material wall thickness remains constant, the quantity of material per cross sectional area increases towards the first free end region, thereby implying that the rotational stiffness increases. Advantageously, the diameter increases between 15 and 45%, preferably about 30%.

In order to allow the spring 14 to act as a spring, it is resiliently supported by the subframe 36 at at least one location substantially equidistant from the two pivot locations 38. In FIG. 1, three such resilient supports are illustrated and denoted by reference numeral 40. These resilient supports are preferably in the form of rubber bushes or the like.

With particular reference to FIG. 2, in a preferred embodiment of the joint according to the present invention, the socket 28 on the second member 16 and the first free end region 20 of the first component 14 each comprise a plurality of, in the shown example six, coacting planar surfaces. As is apparent from FIG. 3, the planar surfaces 32 of the first free end region 20 advantageously present a diameter which is greater than the diameter of the first end portion 18 immediately adjacent the planar surfaces 32 to thereby define a step 42 along the first end portion 18. The socket 28 on the second member 16 preferably presents a circumferential region 44 of thinner material which extends axially past the planar surfaces 23 of the first free end region 20 of the first component 14. This region of thinner material is adapted to be crimped over the step 42 on the first end portion to thereby assist in holding the joint 12 together.

Advantageously, the first component 14 is a press fit on the tapered pin 26 of the second component 16 at least in the first free end region 20 the first component. Preferably, the tapered pin 26 is slightly rounded so that a gradual transition is attained between the two joined parts to thereby reduce the likelihood of stress concentration zones being formed. By coating the tapered pin with an adhesive 46 along its entire outer surface, a more even load distribution is attained over the pin. A similar effect can also be achieved by drawing a suitable plastics sleeve over the tapered pin 26.

Naturally, the invention is not restricted to the embodiments described above and shown in the drawings, but may be varied within the scope of the appended claims. For example, the first and second components need not form part of a vehicle suspension system, but instead may comprise components in any system in which it is desired to achieve a torque-transmitting joint between the components. Naturally, the first component may be made of material other than a fiber/resin composite.

What is claimed is:

1. A joint between an at least hollow ended, generally cylindrical first component and a second component, said first component comprising a first end portion terminating in a first free end region, a second end portion terminating in a second free end region, and a mid portion extending between said first and second end portions, said amid portion presenting a first predetermined external diameter and said first end portion presenting an external diameter which increases gradually from said first predetermined external diameter to a second predetermined external diameter at said first free end region, said first free end region presenting a free end from which at least one planar surface axially extends;

said second component comprising:

a generally ring-shaped socket presenting at least one substantially planar circumferentially and axially extending surface, and a tapered pin extending from within said ring-shaped socket, wherein said first end portion of said first component is adapted to be pushed onto said tapered pin of said second component to a joined position such that, when approaching said joined position, said first component is constrained by said second component to be displaced in a substantially axial direction only and, when in said joined position said first free end region of said first component extends into said generally ring-shaped socket of said second component and said at least one planar surface extending axially from the free end of said first free end region of said first component abuts said at least one substantially planar circumferentially and axially extending surface of said second component.

2. The joint as claimed in claim 1, wherein said generally cylindrical first component exhibits a substantially constant material thickness in said first end portion from said mid portion to said first free end region.

3. The joint as claimed in claim 2, wherein said ring-shaped socket and said first free end region each comprise plurality of coacting planar surfaces.

4. The joint as claimed in claim 3, wherein said substantially planar surfaces of said first free end region occupy a diameter which is greater than the diameter of the first end portion immediately adjacent said planar surfaces to thereby define a step along said first end portion.

5. The joint as claimed in claim 4, wherein said ring-shaped socket presents a circumferential region of thinner material which extends axially past said planar surfaces of said first free end region, said region of thinner material being adapted to be crimped over said step of said first end portion.

6. The joint as claimed in claim 1, wherein said first component is a press fitted on said tapered pin at least in said first free end region of said first component.

7. The joint as claimed in claim 6, wherein said tapered pin is coated with an adhesive.

8. The joint as claimed in claim 1, wherein said first component is made of composite fiber and said second component is cast in metal.

9. The joint as claimed in claim 8, wherein said first component is a combined spring and anti-roll bar and in that said second component is a suspension arm.

10. The joint as claimed in claim 1 or claim 9, wherein the second end portion of said first component in the same manner as the joint between the first end portion of the first component and the second component joined to a third component.

11. A joint between an at least hollow ended, generally cylindrical first component and a second component, said first component comprising:

a first end portion terminating in a first free end region, a second end portion terminating in a second free end region, and a mid portion extending between said first and second end portion, said first end portion exhibiting a substantially constant material thickness from said mid portion to said first .free end region, said mid portion presenting a first predetermined external diameter and said first end portion presenting an external diameter which increases gradually from said first predetermined external diameter to a second predetermined external diameter at said first free end region, said first free end region presenting a free end from which a plurality of coacting planar surfaces axially extend, said plurality of coacting planar surfaces occupying a diameter which is greater than the diameter of the first end portion immediately adjacent said planar surfaces to thereby define a step along said first end portion;

said second component comprising:

a generally ring-shaped socket presenting a plurality of circumferentially and axially extending coacting planar surfaces, and a tapered pin extending from within said ring-shaped socket, wherein said first end portion of said first component is adapted to be pushed onto said tapered pin of said second component to a joined position such that, when approaching said joined position, said first component is constrained by said second component to be displaced in a substantially axial direction only and, when in said joined position, said first free end region of said first component extends into said generally ring-shaped socket of said second component and said plurality of coacting planar surfaces extending axially from the free end of said first free end region of said first component abuts said plurality of circumferentially and axially extending coacting planar surfacess of said second component.

12. The joint as claimed in claim 11, wherein said ring-shaped socket presents a circumferential region of thinner material which extends axially past said planar surfaces of said first free end region, said region of thinner material being adapted to be crimped over said step of said first end portion.

* * * * *

UNITED STATES PATENT AND TRADEMARK OFFICE
CERTIFICATE OF CORRECTION

PATENT NO. : 5,836,712
DATED : November 17, 1998
INVENTOR(S) : Zetterström

It is certified that error appears in the above-identified patent and that said Letters Patent is hereby corrected as shown below:

Column 1, line 46, "extend" should read --extending--.

Column 2, line 23, after "to" insert --the--.

Column 3, line 21 "me" should read --same--.

Column 3, line 53, after "20" insert --of--.

Column 3, line 60, "plastics" should read --plastic--.

Column 4, line 10, "amid" should read --mid--.

Column 4, lines 42, 43, "comprise plurality" should read --comprise a plurality--.

Column 4, line, 67, delete "in the same".

Column 5, lines 1-2, delete "manner as the joint between the first end portion of the first component and the second component".

Column 5, line 2, before "joined", insert --is--.

Column 5, line 3, after "component", insert --in the same manner as the joint between the first end portion of the first component and the second component.--.

Column 5, line 12, delete "."

Signed and Sealed this

Eighth Day of June, 1999

Attest:

Q. TODD DICKINSON

*Attesting Officer*     *Acting Commissioner of Patents and Trademarks*